US010089611B1

(12) United States Patent
Eisher

(10) Patent No.: US 10,089,611 B1
(45) Date of Patent: Oct. 2, 2018

(54) SHARING DIGITAL MEDIA

(71) Applicant: Amazon Technologies, Inc., Reno, NV (US)

(72) Inventor: Eric Scott Eisher, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 875 days.

(21) Appl. No.: 14/297,540

(22) Filed: Jun. 5, 2014

(51) Int. Cl.
*G06F 21/00* (2013.01)
*G06Q 20/12* (2012.01)
*G06F 21/62* (2013.01)

(52) U.S. Cl.
CPC ..... *G06Q 20/1235* (2013.01); *G06F 21/6209* (2013.01)

(58) Field of Classification Search
None
See application file for complete search history.

(56) References Cited

U.S. PATENT DOCUMENTS

| 5,892,900 | A | * | 4/1999 | Ginter | G06F 21/10 726/26 |
| 5,933,824 | A | * | 8/1999 | DeKoning | G06F 9/52 |
| 7,457,880 | B1 | * | 11/2008 | Kim | G06F 17/30171 709/216 |
| 8,239,546 | B1 | * | 8/2012 | McGowan | H04L 65/1069 709/227 |
| 2002/0049717 | A1 | * | 4/2002 | Routtenberg | H04H 60/21 |
| 2006/0294128 | A1 | * | 12/2006 | Gottschalk | G06F 17/30017 |
| 2009/0083677 | A1 | * | 3/2009 | Darwish | G06F 17/2229 715/854 |

* cited by examiner

*Primary Examiner* — Steven S Kim
*Assistant Examiner* — Timothy Paul Sax
(74) *Attorney, Agent, or Firm* — Thorpe North & Western, LLP

(57) ABSTRACT

Technology for sharing digital media is provided. In one example, a method may include identifying a first consumer. A request may be received from a second consumer requesting to consume the digital media. A first segment of the digital media being consumed by the first consumer may be identified. The digital media may be provided to the second consumer for consumption at a second segment of the digital media different from the first segment being consumed by the first consumer.

19 Claims, 9 Drawing Sheets

SHARING DIGITAL MEDIA

BACKGROUND

A large and growing population of people enjoy entertainment or digital media through consumption of digital content items, such as music, movies, images, books and other types of digital content. Many people today consume digital media through a wide variety of electronic devices. Among these electronic devices are electronic book readers, cellular telephones, personal digital assistants (PDAs), portable media players, tablets, netbooks, and the like.

As more content is made available in digital form, the economic landscape for media creation, production, and distribution is evolving. This is particularly the case for music, movies, and electronic books (or "ebooks"). Such media items may be distributed online to electronic devices, without production of a portable physical medium, such as a tape cassette, CD (compact disc), DVD (digital video disc), or a physical paper-based book. As a result, many of the transaction costs associated with traditional channels of distribution on physical media are being reduced or eliminated entirely. This leads to the possibility of new economic and social models involving selling, lending, and borrowing of digital items.

Electronic distribution of information has gained in importance with the proliferation of personal computers, mobile devices and mobile phones, and electronic distribution has undergone a tremendous upsurge in popularity as the Internet has become widely available. With the widespread use of the Internet, it has become possible to quickly and inexpensively distribute large, coherent units of information using electronic technologies.

DETAILED DESCRIPTION

A technology for sharing segments or sub-portions of digital media is provided. In one example, a method may include identifying a digital media licensee and receiving a request from the digital media licensee to share digital media with a consumer. A request may be received from the consumer requesting to consume the digital media. A first segment of the digital media being consumed by the digital media licensee may be identified. A second segment of the digital media may then be provided to the consumer for consumption of the digital media at a segment in the digital media which is different from the first segment being consumed by the digital media licensee. If the digital media licensee and the consumer try to access the same segment, then the digital media licensee or the consumer may be restricted from consuming the same consumption segment.

In a more specific example, a method may include identifying digital media that is segmented into a plurality of segments. The digital media may be any suitable type of digital media or content, such as an audio, video, image, ebook, text, video game, etc. The method may include identifying a digital media licensee having rights to access the digital media, such as a purchaser of a movie or song (i.e., a purchaser of a license of rights to access, view or play the digital media). The digital media licensee may select a consumer, using an invitation by social network, email, or other suitable digital communication method, and grant access to the consumer to consume the digital media. The consumer may access segments of the digital media that are not being accessed by another consumer invited by the licensee or segments that are not being accessed by the licensee.

A request may be received from the digital media licensee to consume the digital media. Similarly, another request may be received from the consumer to consume the digital media but at a different point within the digital media. In a media server mediated implementation, the media server may identify a consumption segment of the plurality of segments of the digital media being consumed by the digital media licensee and the consumer. The digital media licensee and the consumer may be restricted from consuming an identical consumption segment. Consuming different segments of the digital media means that any individual segment of the digital media as licensed to the digital media licensee may be consumed by a single user at a time but not more than one user or customer at a time.

Figure 1A:
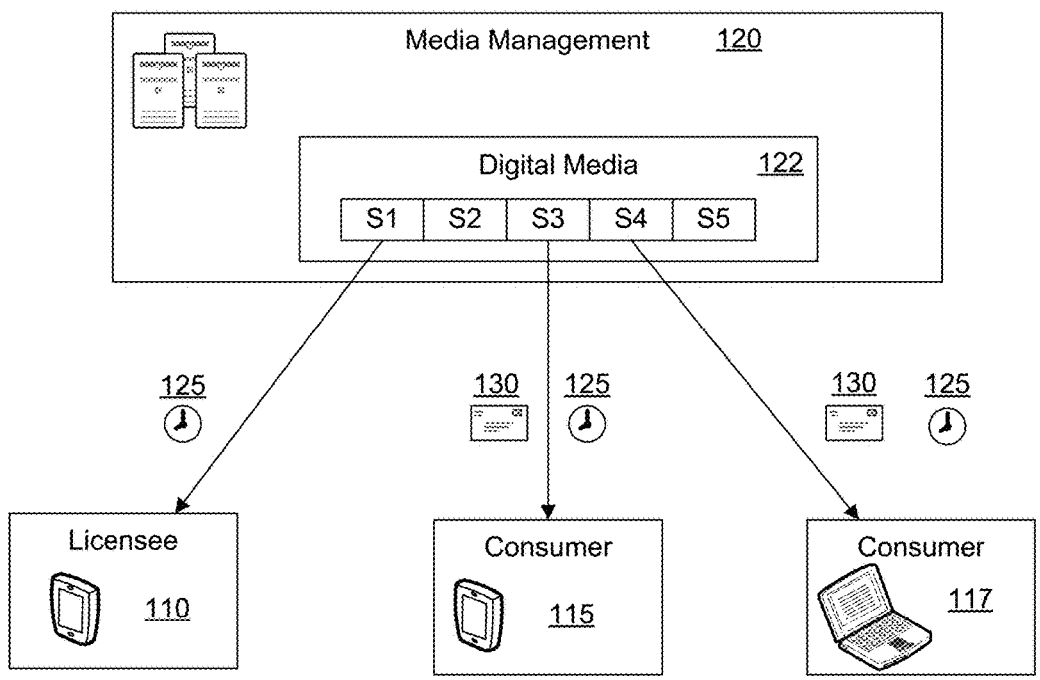
FIG. 1a is a schematic overview of a system for sharing digital media using a media management server in accordance with an example of the present technology.

FIG. 1a illustrates an overview of a system for sharing digital media 122 purchased by a licensee and shared with one or more consumers who have not purchased licenses for themselves, in accordance with an example. FIG. 1a illustrates a licensee 110 (e.g., licensee device), in communication with a media management server 120, which is in communication with one or more consumers 115, 117 (e.g., consumer devices). The licensee 110 and consumers 115, 117 may be in communication with one another over a network and/or through the media management server 120.

The licensee 110 may be a licensee of digital media 122. For example, the licensee 110 may purchase the digital media 122 from an electronic store. The digital media 122 may be made available to the licensee 110 for download or streaming. The digital media 122 may be stored at the media management server 120 and/or on the licensee 110. When the licensee 110 purchases the digital media 122 (e.g., when the licensee 110 purchases an MP3 for an audio track) the licensee may be actually purchasing a license to use, replay, or access the MP3 without actual ownership of the actual content contained in MP3. For example, the licensee 110 may be restricted from: reselling the MP3 or otherwise transferring ownership of the MP3 to another individual, from consuming the MP3 on non-approved devices, and so forth.

One method of enforcing licensing terms for licensees is the use of Digital Rights Management (DRM). DRM may refer to a class of technologies that are used by distributors, retail sellers, hardware manufacturers, publishers, copyright holders, and individuals to control the use of digital content after the sale of the digital content. DRM technologies attempt to enable the seller of digital content to maintain control over the media or devices after such digital goods have been sold to a licensee. For digital content this may involve preventing access, denying the ability to copy the content, restricting conversion to other formats and so forth.

A licensee 110 is often granted access to the media content for personal consumption. However, some licensing exceptions to this rule exist. For example, certain licensing schemes have been used to allow public or non-personal use, sharing, display, etc. In the context of ebooks, public libraries commonly lend ebooks to patrons, where the public library is the licensee of the ebook and has been granted limited rights to "check-out" the ebook to the patrons. As another example, digital content lending libraries may be used with individuals as licensees to share purchased ebooks with other consumers. More specifically, a licensee of an ebook may loan the ebook to a friend on a one time basis and/or for a limited time. Various restrictions ma be implemented in this case, such as restricting access to the ebook by the licensee while the consumer is sub-licensing or borrowing the ebook from the licensee. Digital media 122 may be provided at different price points with different licensing terms to allow for different sharing permissions. Typically, a licensee may purchase a license for a single copy of digital media 122. For this reason, libraries, individuals and the like are typically not permitted to simultaneously consume digital media 122 while lending the digital media 122 to another consumer or to simultaneously lend digital media 122 to multiple consumers.

The present technology may enable sharing of digital media on a more granular basis, where rather than restricting access to an entire digital media title to a single consumer at a time (such as the licensee or an additional consumer), digital media may be consumed in segments, such that multiple consumers may simultaneously consume separate segments of the digital media as long as the consumers are not consuming an identical segment at a same time.

The digital media may be divided into any number of a plurality of segments. The plurality of segments may represent segmented digital media, such as an individual song split into multiple separate electronic files. The segments may represent a measurement, quantification or or another pre-defined size segment for the digital media. For example, the segments may be a number of bits, bytes, kilobytes, megabytes, etc. The segments may also be measured in milliseconds, seconds, minutes, etc. The segments may be words, phrases, pages, chapters, sections, etc. A segment may generally represent less than an entirety of a digital media title or digital media content. For example, the segment may be less than a full song, book, movie, image or the like. Digital media may be segmented into equal sized segments or alternatively into segments with varying sizes. For example, a licensor may wish to permit a greater number of consumers to consume less desirable portions of the digital media and a smaller number of consumers to consume more desirable portions of the digital media to create a sense of demand, and may thus segment the less desirable portions into a greater number of smaller segments and the more desirable portions into a smaller number of larger segments. For example, a book or movie may be segmented in this way to allow a large number of consumers to begin sampling the book. For the climax or other designated segment(s), using large segments restricts a larger number of viewers. Rather than wait for a turn in the queue, viewers may opt to purchase the book or movie or pay for prioritization in the queue to consume the desirable segment(s).

Alternatively, in a reverse implementation the more desirable portions may be segmented into smaller segments to allow a greater number of consumers to enjoy the more desirable portions, while the less desirable portions may be segmented into relatively larger segments. The digital media 122 may be pre-segmented or rather segmented in advance of consumption of the digital media 122, or the digital media 122 may be segmented during consumption, or the digital media 122 may use segmentation as a method of defining portions of the digital media 122 without actually dividing the digital media into specific segments. In other words, segmentation may represent a concrete, readily identifiable discretization of portions of the digital media 122 or alternatively may represent a more abstract or mathematical identification of different portions of the digital media 122 without modification, labeling, tagging, storing separate files or similar methods for the digital media 122.

With the digital media 122 segmented in this manner, a licensee 110 may consume any segment of the digital media 122 at the same time as one or more consumers 115, 117 are consuming one or more different segments of the same digital media 122. In one example, a segment may be a rolling segment. For example, in the case of digital music, a consumer may be consuming a song at a specific location measured in milliseconds from the beginning of the song. The segment may be at the specific location, such as the specific few milliseconds at which the consumer is listening to the song, or the segment may include a buffer of a predetermined size before and/or after the specific location. For example, a buffer of a half second, two seconds, ten seconds, or the like may be provided on either side of the specific location to ensure other consumers are not consuming the same segment at substantially the same time. As the location progresses through the song, the buffer "rolls" along with the location, before and after the location, to provide a rolling segment that is locked to other consumers. In an example of an ebook, the segment may be a word, sentence, page, or the like, and may similarly have a buffer, which may be a rolling buffer, to ensure compliance with applicable licensing terms.

Licensing terms may vary depending on the particular application. For example, some licensees may desire greater segmentation of digital media into smaller segments. This may allow a greater number of consumers to simultaneously consume the digital media using different segments of the digital media. Other licensees may desire lesser segmentation of the digital media so that fewer, larger segments are available, in order to restrict the number of simultaneous consumers. DRM may also be provided as a method of restricting the number of consumers able to access the digital media.

Still referring to FIG. 1, the media management server 120 may store the digital media 122 purchased by the licensee 110. The licensee 110 may indicate a desire to share the digital media 122 with other consumers 115, 117. For example, the licensee 110 may specifically identify consumers 115, 117 by email address, user name, IP (internet protocol) address, or the like. As another example, the consumers 115, 117 may be socially or electronically connected to the licensee and receive invitations to consume the digital media 122 via a social network. The media management server 120 may be configured to receive requests to share the digital media 122 from the licensee. The media management server 120 may be configured to provide notifications 130 to the invited consumers that the digital media 122 has been shared and is available for consumption.

The media management server 120 may stream the digital media 122 to the licensee 110 and/or consumers 115, 117. Because the media management server 122 may be streaming the digital media 122, the media management server may be able to monitor segments (S1-S6) of the digital media 122 being consumed. Continuing with the example above of a song segmented into time segments, the media management server 120 may monitor the time 125 in the song being consumed by each of the licensee or consumers and prevent simultaneous consumption of any specific segment of the song.

A specific example implementation will now be described. Eric just bought Wilco's new song, "Impossible Germany", on ElectronicStore.com. Because of the sharing technology, Eric can invite his friends to listen to this purchase as well. As long as no two people are streaming the same segment of music as one another, everyone can happily experience Eric's purchase together.

Tim, one of Eric's friends, is listening to Impossible Germany at his home in New York City while Eric is also streaming the song from his home in San Francisco. Tim tries to move forward in the song exactly 30 seconds from where Tim is currently listening, but Eric is listening to that segment in the song (e.g., at 01 m 30 s 24 ms), so Tim's music buffers for a brief moment while Eric's stream passes that segment in the song. If the buffering or delay is greater than a predetermined threshold, a notification may be provided with an estimated delay or with a countdown until consumption will resume. Because multiple consumers may be prevented from simultaneously consuming the same segment, priority may be given to the consumer who is currently listening to a particular segment. Other consumers desiring to consume the segment may be queued until the segment is available for consumption.

Continuing with this example, Eric is now streaming another song he really enjoys but pauses the song at precisely 1 m 0 s. His friend Megan begins streaming the same song. Eric comes back to his computer and presses play precisely when Megan is at 1 m 0 s. Because Megan is currently consuming that segment, Eric's playback experience buffers until the segment is made available again. In an alternative implementation, Megan's consumption of the segment at 1 m 0 s may be blocked because Eric is paused at that segment.

In the above example, the pause event may be considered a termination of consumption, albeit temporary. Thus, because Eric was not consuming the segment at the time Megan reached the segment to consume the segment, Megan's consumption may be prioritized over Eric's consumption and Eric may be queued or buffered until Megan's stream has progressed to a subsequent segment. Initiating, pausing, resuming, or stopping playback of the digital media may result in a check in or check out of a segment of the digital media from consumption. Thus, when pausing or stopping consumption, a consumer may be "checked out" to allow other consumers to consume the segment at which consumption paused or stopped. Initiating or resuming playback may operate as a "check in" to indicate that a segment is being actively consumed and is unavailable to other consumers.

FIG. 1a illustrates an example of mediated sharing where a media management server 120 manages the sharing of the digital media 122 between consumers 110, 115, 117 to ensure compliance with licensing terms. While the examples above primarily relate to implementations where the media management server serves the digital media 122 to the consumers, the digital media 122 may optionally be located at the licensee 110 or consumer 115, 117 or somewhere else accessible using a network connection, such as a connection to the Internet. For example, a copy of the digital media 122 may be streamed from the licensee 110 to the consumer 115, 117 via the media management server 120 or directly to the consumer 115, 117. The licensee 110 and consumers 115, 117 may be in communication with the media management server 120 with playback of the digital media 122 permitted by the media management server 120 when a segment to be consumed is not being consumed by another consumer.

As another example, the digital media 122 may be partially or wholly stored on a storage device of the licensee 110 and/or consumer(s) 115, 117, such that the digital media 122 is not streamed, but played locally. In this example, the consumer 115, 117 and licensee 110 may also be in contact with the media management server 120 to negotiate permissions to consume specific segments of the locally stored digital media.

Figure 1B:
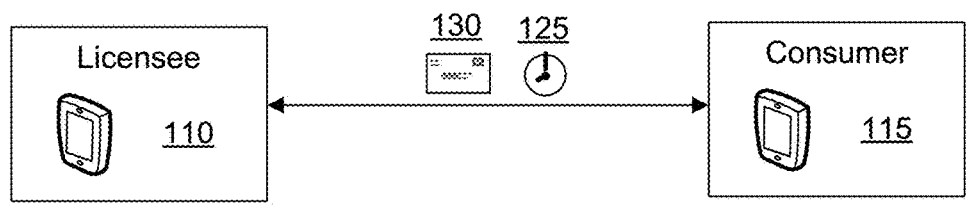
FIG. 1b is a schematic overview of a system for sharing digital media directly between devices in accordance with an example of the present technology.

FIG. 1b illustrates an alternative implementation where a media management server does not mediate the sharing of the digital media. In this example, a licensee 110 may share the digital media with the consumer 115 directly without mediation, such as over a local wireless network, over a direct Wi-Fi or wired network, over a Bluetooth connection, or any other suitable type of connection. The digital media may be streamed or copied from the licensee 110 to the consumer 115. The licensee 110 and consumer 115 devices may be in communication with one another to coordinate segment consumption and ensure that different segments are being consumed at the different devices when each of the devices is simultaneously consuming the digital media. For example, the licensee 110 and consumer 115 devices may exchange time stamp information relating to the latest time stamp consumed. The exchange of time stamps 125 or other segment consumption data may be continuous during consumption or may be at predetermined intervals of time. The predetermined intervals of time may be shorter, longer, smaller, larger, etc. with respect to the segments of the digital media, and may vary to suit particular applications or implementations.

In one example, when a network connection is broken, the digital media may become unavailable for consumption to one or more of the licensees or consumers. Where the digital media is streamed, the disruption of a network connection may result in failure to receive data and thus consumption may be stopped. Also, sharing rights to the digital media may be terminated in the lack of network connection. Where the local digital media is stored on the consuming device, loss of network connectivity may similarly result in termination of consumption ability to ensure that multiple consumers are not consuming a same segment of the digital media.

The present technology may more fully utilize digital media purchased by consumers. A great deal of digital media remains infrequently used. The present technology may allow licensees to provide a benefit to others for the digital media purchased and not currently being consumed or at least provide additional benefit to other consumers where a segment of the digital media is not currently being consumed. The present technology may assist in mitigating customers away from the illegal sharing of digital media and may encourage purchases of digital media. As is further described below, restrictions may be enforced on a number of times consumers may consume the digital media, which may encourage a purchase of the digital media. Sharing of purchased digital media with friends or other contacts in a social network may allow licensees to create a reduced cost streaming library. Further, licensees may charge a small fee for members of the social network to access the shared digital media to profit from the purchase of the digital media.

Figure 2:
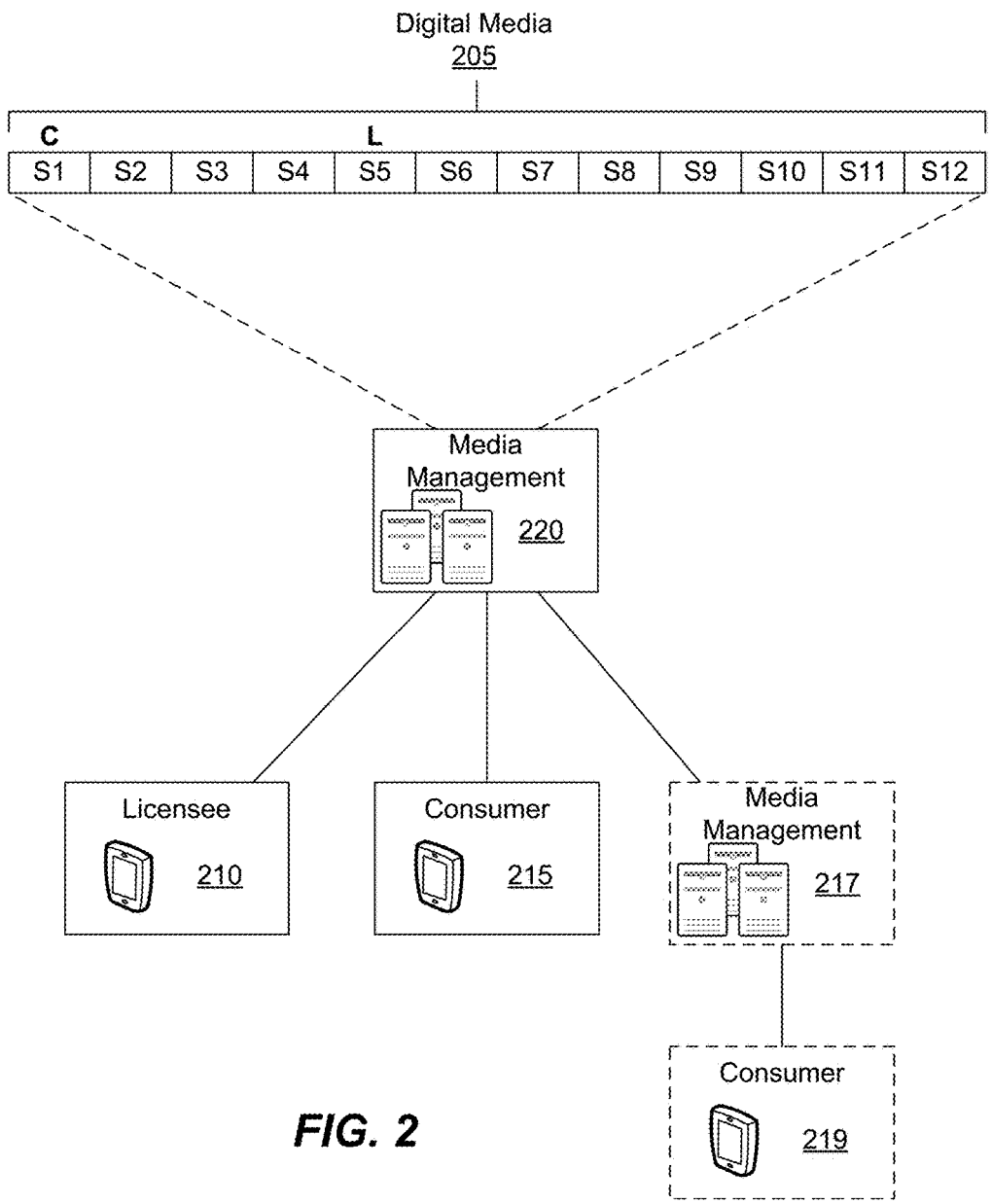
FIG. 2 illustrates sharing of digital media based on consumption of media segments by other users in accordance with an example of the present technology.

FIG. 2 illustrates an example segmentation of digital media 205. A licensee 210 and consumer 215 are simultaneously consuming the digital media 205 via streaming from a management server 220. The digital media 205 has been segmented into twelve segments (S1-S12) of equal size. Because the licensee 210 is consuming segment S5 represented at L, the consumer 215 may be free to consume any other segment of the digital media. For instance the consumer 215 may start at S1 as represented at C. The licensee 210 and consumer 215 may jump around within the digital media to any of a number of different segments in any particular order without progressing linearly from a first segment to a last segment, as long as the same segment is not simultaneously consumed. In the event that the licensee 210 and consumer 215 attempt to simultaneously consume a single identical segment, one or the other may be buffered or caused to wait until the segment becomes available. As mentioned previously, a notification, countdown or the like may be provided when the wait is estimated to be longer than a predetermined threshold time interval.

If each of the segments S1-S12 represent 10 seconds of a song, the consumer 215 may attempt to consume the same segment S5 as the licensee 210 beginning at the start of segment S5 while the licensee 210 is nearing the end of segment S5. However, due to the segmentation, the consumer 215 may be forced to wait until the segment is available. This may be an example of fixed segments. Fixed segments may be contrasted with the rolling segment (e.g., a moving segment window) described previously, which are not fixed in time but which move or roll along with consumption. For example, a 10 second segment window may be created that is centered on a point in the digital media being consumed by the licensee 210 or consumer 215 and the moving segment window may constantly move along with the playback point.

FIG. 2 further illustrates an example where one of the consumers of the digital media 205 may be another media management server 217 with one or more consumers 219 consuming the digital media 205 from the media management server 217. In this example, the digital media licensee 210 may share the digital media 205 with consumers 215 and 217. Consumer 217, as a media management server, may be restricted to accessing segments of the digital media 205 that are not currently being consumed by the licensee 210 or consumer 215. The media management server 217 may serve a single segment from the digital media 205 to one or more consumers 219 or may consume multiple different segments concurrently which are not being consumed by licensee 210 or consumer 215. Media management server 217 may similarly restrict the one or more consumers 219 from simultaneously consuming a same segment from media management server 217.

This disclosure describes various architectures and techniques in which digital media may be loaned and borrowed. The architectures provide a functional environment to permit concurrent access to separate parts of such digital media. In one example, the licensee may wish to lend digital media to a "friend" or "follower" in a social network. A recommendation may be provided to the licensee automatically upon finishing the digital media (e.g., after reading an entire ebook) to lend his or her digital media to another user in the social network. The recommendations may be based, for example, on relationship proximity or reputation in the social network.

In another example, the licensee may have digital media to lend and may also wish to borrow certain digital media. A loan-matching infrastructure may identify another user with complementary lendable items and borrowing desires. The loan matching may additionally function as a mechanism for introducing users that are in the same social network but are not yet connected to one another in that social network or the loan matching may serve to strengthen the relationship between users who are already connected.

As a further example, the architecture may enable a licensee with lendable digital media to broadcast and/or narrowcast the availability of the digital media to friends and/or many other users. One of multiple users that respond to the broadcast/narrowcast may be selected by the licensee based on speed of response, social network relationship, and the like. For digital media that is able to be lent a limited number of times, this technique of soliciting many responses may assist the licensee in deciding which user or users are allowed to borrow the digital media.

The digital media may be manifest in many different ways including, for example, as text-based items, audio items, video items, multimedia items, image or graphical items, interactive items, game items, mobile apps and so forth. While specific examples of the technology may be described with respect to a particular type of digital media, the concepts described may be also applicable to other types of digital media. When describing any particular part or implementation of the technology, such as when describing the system, or the related devices or methods, individual or separate descriptions are considered applicable to one other, whether or not explicitly discussed in the context of a particular example or implementation. For example, in discussing a device per se, other device, system, and/or method embodiments are also included in such discussions, and vice versa.

Figure 3:
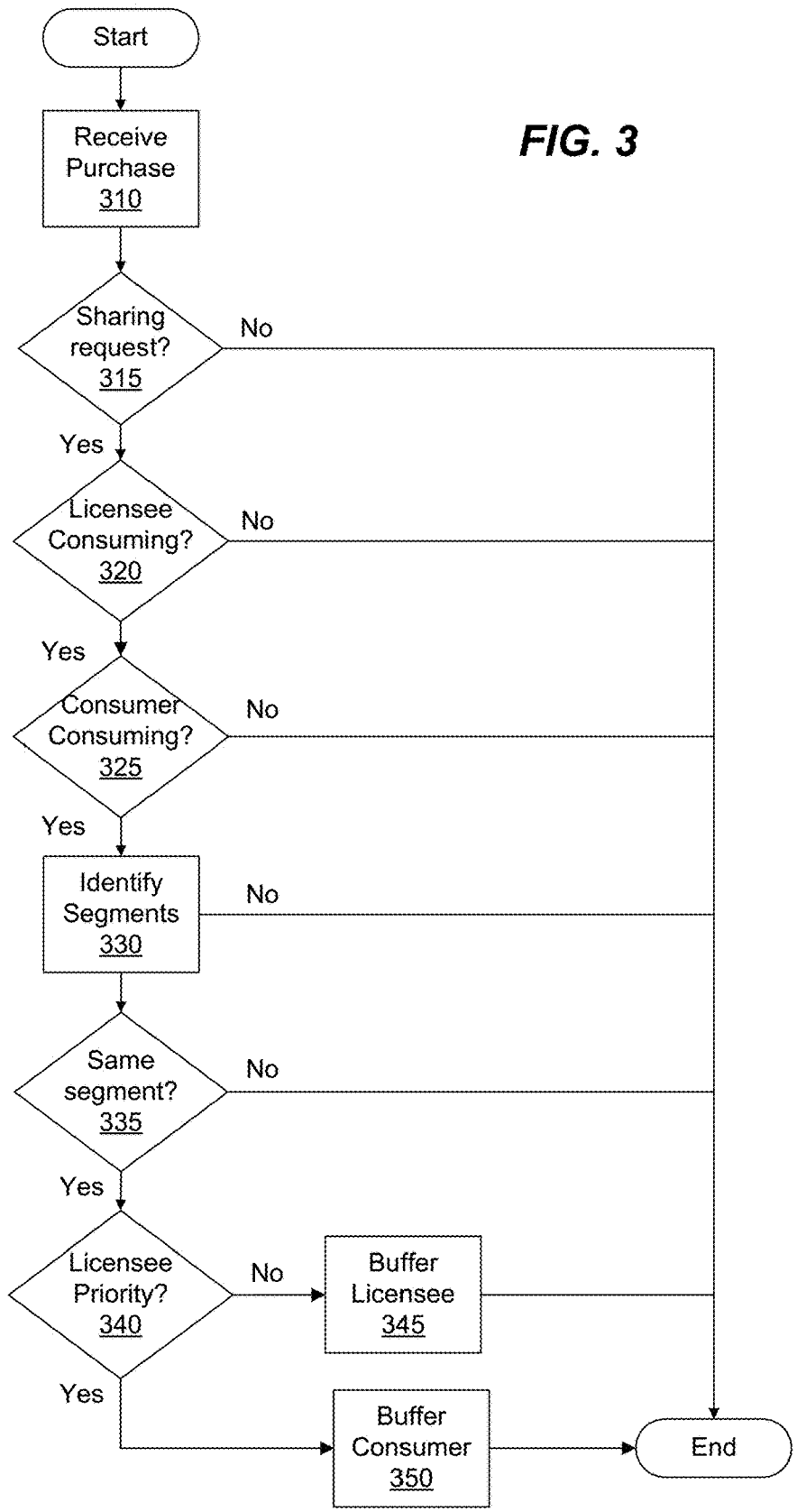
FIG. 3 is a flow diagram for sharing digital media in accordance with an example of the present technology.

Referring to FIG. 3, a decision diagram is illustrated for sharing digital media in accordance with an example of the present technology. An electronic store may receive or identify a purchase 310 of digital media by a consumer. The purchasing consumer may be referred to as a licensee with a license to consume the digital media and to share the digital media. The system may wait until a sharing request 315 has been received. If a sharing request is not received, the process may terminate. A sharing request may be a request from the licensee to lend digital media to a consumer, or alternatively may be a request from a consumer to borrow the digital media from the licensee. When a sharing request is received and the consumer wishes to consume the digital media, the process may query whether the licensee is consuming the digital media 320 and whether the consumer is consuming the digital media 325, or at least which segment of the digital media the consumer desires to consume.

If one or the other of the digital media licensee and the consumer are not consuming the digital media, then the process may terminate. However, if both of the licensee and the consumer are consuming the digital media or desire to consume the digital media at a same time, the process may identify the segments 330 being consumed or desired to be consumed. If the segments for the consumer and the licensee are the same 335, rules may be queried to determine whether the licensee receives priority to consume the segment 340. If the segments for the consumer and the licensee are not the same, the process may terminate. If the segments are the same and the licensee does not have priority over the consumer, the licensee consumption may be buffered 345 or delayed. If the segments are the same and the licensee does have priority over the consumer, the consumer consumption may be buffered 350 or delayed.

By extension, the process of FIG. 3 may be applied for any number of consumers consuming digital media. For example, when a request to consume the digital media, or more specifically when a request to consume a particular segment of the digital media, is received, an analysis may be made as to whether that particular segment is being consumed by another consumer. When the segment is available, consumption may begin immediately. When the segment is being consumed by another consumer, consumption may be delayed according to a queue of other consumers consuming or waiting to consume the segment.

Figure 4:
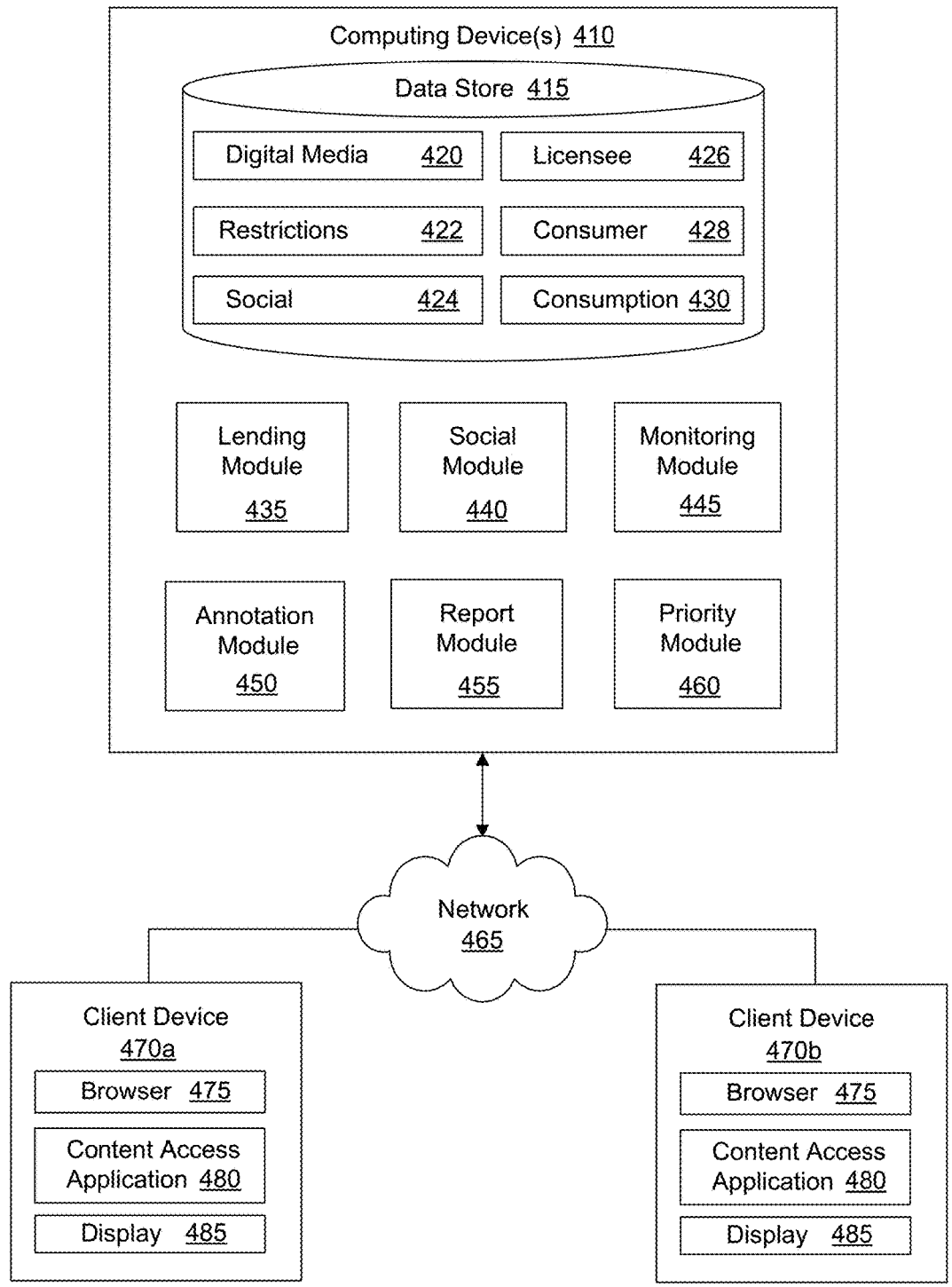
FIG. 4 is a block diagram of a system for sharing digital media in accordance with an example of the present technology.

Referring now to FIG. 4, a block diagram of a system for sharing digital media is illustrated in accordance with an example of the present technology. The system may be implemented using one or more computing devices 410, such as a server for example, as well as client devices 470a, 470b, and may be implemented using a network 465. The system may include a data store 415 and a number of modules 435, 440, 445, 450, 455, 460 for storing and processing digital media sharing and consumption data.

FIG. 4 illustrates a system for enabling the loan of a segment of a digital media item from a lender or licensee device (e.g., client device 470a) to a borrower or consumer device (e.g., client device 470b). Consumption of the digital media and mediation of the terms of the loan may be managed by a lending module 435 present in the system.

During the loan, a copy of the digital media may remain on a local memory of lender's client device 470a, but one or more segments of the digital media may be deactivated when the consumer is consuming the one or more segments to prevent the licensee from consuming that one or more segment. In other implementations, the licensee may retain limited or unlimited rights to access the segment(s) of the digital media while the segment is being consumed.

When the consumer completes consumption of the digital media, "returns" the digital media, rejects the digital media, or when the loan of the digital media has expired, or when the consumer purchases the digital media, rights of the consumer from the licensee to further consume the digital media may be terminated. Any consumption of segments of the digital media may thus cease and the licensee may have access to any segment of the digital media that was loaned to the consumer.

Digital media may be eligible for lending a limited number of times. Some digital media may be lendable one time. Borrowing may also be restricted. For example a given consumer may be permitted to borrow digital media once from any source and then may be prevented from borrowing that same digital media in the future from any source. Other digital items may be able to be loaned or borrowed more than once or an unlimited number of times. The number of times the digital item may be loaned or borrowed may be enforced by the lending module 435 through the use of DRM or similar technology to prevent copying or transfer of data from one device to another. The owner or rights holder of a particular copy of the digital media may choose to limit the number of times that the digital media may be lent. The lending module 435 may support solicitation of consumers for accessing the digital media as well as solicitation from consumers to loan the digital media.

Loaning of digital media may be a loan of rights to an entirety of the digital media in a title or item being loaned, but subject to segment by segment verification of whether a particular location or segment in the digital media for a title is concurrently being consumed by someone else. Thus, the loan may permit the consumer to consume a single segment of the digital media at a given time, and consumption of other segments of the digital media may be subject to restrictions, delays, queuing or the like based on the consumption of others.

Digital media, and permission to lend/borrow digital media, may be valuable commodities that may be brokered in a marketplace and even monetized. For example, a copy of digital media may be available for purchase for $9.99 for a non-lendable version, or $12.95 for a lendable version. The value of borrowing a copy of the digital media from a purchaser/licensee may be based the on difference in prices of the lendable and non-lendable versions.

In one example, the licensee may loan digital media for either a finite period or for an unlimited time to the consumer. When initiating a loan of the digital media, the licensee may interact with a user interface (UI) on a display 485 of the licensee device 470a. The lending UI may include an entry box in which the licensee may enter an identity of the party to whom the digital media is being loaned (e.g., consumer at client device 470b). The consumer may be identified by a personal identifier or an email address, although other conventions may be employed (e.g., name, account number, identifier, etc.). The UI may also include options for specifying a duration of the loan. The options may permit selection of a finite period, such as a number of days to loan the item or an indefinite period. Other options may be presented, as well as other duration units (e.g., hours, weeks, months, etc.). Upon expiration of the predetermined loan, the lending module 435 may automatically prevent the consumer from accessing the digital media on the client device 470b. In some implementations, the consumer may receive a warning notification when the end of the loan period is drawing near. The monitoring module 445 may monitor the expiration of the loan, as well as consumption of the digital media, including any section of the digital media currently being consumed by the licensee or the consumer.

The system may include a report module 455. The report module 455 may automatically generate and transmit reports to the licensee, such as including sharing statistics, digital media loaned out, consumption of lent digital media, and so forth. The reports may be generated on a daily, weekly, monthly or other basis. Various other types of information may also be provided within the reports. For example, the reports may provide anonymous demographic data about the consumers (such as age, gender, nationality, race and so forth), data regarding purchases based on the loan, any problems occurring with attempts to consume the digital media, and so forth. The report module 455 also may provide licensees with the ability to access an interactive menu to generate custom reports or to set up a report profile that specifies the content, format and frequency of the automated reports.

The data store 415 may include or be configured to store any of a variety of useful types and formats of data. For example, the data store 415 may include a digital media data store 420. The digital media data store 420 may include, for example, the digital media available for purchase to potential licensees, the digital media purchased by licensees and so forth. In other words, the digital media data store 420 may store digital media available for purchase and/or operate as a digital media locker for digital media purchased from an electronic store. The digital media data store 420 may include text, images, audio, video and so forth, and may include data structured for suitable presentation on a client device 470a.

The data store 415 may include a licensee data store 426. The licensee data store 426 may store information such as account information, payment information, contact information, demographic information, purchase history information, personal preferences and so forth. The data store 415 may also include a consumer data store 428 for storing consumer or borrower data, preferences, location, history and so forth. The data store 415 may also include a restrictions data store 422 for storing restrictions or DRM data (e.g., DRM keys) related to consumption or licenses of digital media, which may be referenced when digital media is purchased or consumed, and which may be included with digital media for download. The data store 415 may further include a consumption data store 430 for storing data related to consumption of the digital media, for use by the report module 455, as described above. The data store may further include a social data store 424 for storing social network data, such as a social network graph or credentials for accessing a third-party social network. These various data stores and others may be more fully understood with reference to previous descriptions of these data stores or the data stored by the data stores.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Client devices 470a, 470b may access data, content pages, messages and so forth via the computing device 410 over a network 465. Example client devices 470a, 470b may include, but are not limited to, a desktop computer, a laptop, a tablet, a mobile device, a television, a cell phone, a smart phone, a hand held messaging device, a personal data assistant, an electronic book reader, heads up display (HUD) glasses, a an in-vehicle computer system, or any device with a display 485 that may receive and present the digital media. The network 465 may be representative of any one or combination of multiple different types of networks, such as the Internet, cable networks, cellular networks, wireless networks (e.g., Wi-Fi, cellular, etc.), wired networks and the like.

The various lending and borrowing transactions between the licensee and the consumers may create a network of relationships and interconnections with each digital media item lent. These relationships may be used within a network 465 or a relationship map may be established as part of a social network (e.g., links to "friends," users that are "followed" by other users, and the like) and/or the lending and borrowing may connect users in a social network. The system may include a social module 440 to leverage the social data in the social data store 424 and facilitate management of a social network for purposes of lending or borrowing digital media. In one configuration, a social network may comprise nodes (e.g., the lenders and borrowers) and edges between the nodes (e.g., relationships). The edges between the nodes (i.e., the connections between the lender and borrowers) may be directional. Some of the edges may be two-way and some may be one-way. An example of a two-way edge or relationship may be a "friend" relationship between the licensee and the consumer. An example of a one-way edge or relationship may be a "follower" relationship between the licensee and consumer. The one-way relationship may indicate that information flows one way. For example, the consumer may receive information from the licensee such as lists of digital items consumed or recommended, or options to borrow digital media, but the licensee may not receive similar information from the consumer.

The connections or relationships between the licensee and consumer in the social network may be preexisting and independent of any lending of digital media. Friends, followers, and the like may be established through a social networking website or other system. The social network relationships may be correlated with digital media lending through usernames, email addresses, other contact info, etc. In some implementations, the lending and borrowing activity may create the social network. For example, the social module 440 may connect two users in a social network when one lends digital media to another. Connections may also be formed by borrowing.

In one aspect, the social module 440 may also facilitate communications or notifications between the licensee and the consumer. For example, when the licensee requests to share digital media with the consumer, the consumer may receive a notification via the social module 440. When the consumer accepts the offer, the licensee may receive a notification via the social module 440. When a loan is about to expire, the consumer and/or licensee may receive a notification, and the licensee may have an option to extend the loan to the consumer.

The system may include a priority module 460. The priority module 460 may maintain a waiting list or queue for access to a particular segment of the digital media. Users desiring to consume the segment may be queued to wait until the segment is available for consumption. One possible default behavior of the priority module 460 may be first-in-first-out so that consumers in a queue receive access to the segment of the digital media in the order that each consumer entered the queue. Another possible behavior for the priority module 460 may be to provide priority access to consumers who have paid for priority access.

An annotation module 450 may facilitate the recording and storage of annotations made to digital media. When digital media is annotated by the licensee, those annotations may optionally become part of the digital media and consumers may receive the digital media together with the annotations. However, a licensee may wish to lend out his or her digital media and receive the digital media back free from annotations made by a consumer. In one implementation, consumers may be prevented from annotating borrowed digital media. However, in another implementation consumers may be allowed to annotate digital media on loan, but those annotations may be stored separately from the digital media. The licensee may have the option of incorporating the annotations with the digital media. It is noted that annotation, as well as other operations such as editing, manipulating, accessing, listening, watching, reading, etc. of the digital media may be different forms of consumption.

Marketing opportunities provided when consumers borrows digital media can potentially lead to sales of copies of that digital media. The licensee or purchaser of the digital media that was the originator for one of these marketing opportunities may receive a referral fee or commission when a copy of that digital media is sold due to the licensee's lending activity. The report module 455 may include a computed referral fee to be awarded. The fee may be a monetary amount, such as a portion of the sale proceeds. The fee may alternatively be in the form of credit or discounts toward future purchases made by the licensee. Further, the fee may be some form of non-monetary awards.

The system may be implemented across one or more computing device(s) 410, connected via a network 465. For example, a computing device 410 may include a data store and various engines and/or modules such as those described above and such modules may be executable by a processor of the computing device. The system may be implemented as a plurality of computing nodes, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various applications and/or functional entities described. The components executed on the computing device may include the modules described, as well as various other applications, services, processes, systems, engines or functionality not discussed in detail herein.

The client devices shown in FIG. 4 are representative of a plurality of client devices 470a that may be coupled to the network 465. The client devices 470a may communicate with the computing device over any appropriate network, including an intranet, the Internet, a cellular network, a local area network (LAN), a wide area network (WAN), a wireless data network or a similar network or combination of networks.

Each client device 470a may include a respective display 485. The display 485 may comprise, for example, one or more devices such as cathode ray tubes (CRTs), liquid crystal display (LCD) screens, gas plasma based flat panel displays, LCD projectors, or other types of display devices, etc.

Each client device 470a may be configured to execute various applications such as a browser 475, a respective page or content access application 480 for an electronic retail store and/or other applications. The browser 475 may be executed in a client device 470a, for example, to access and render content pages, such as web pages or other network content served up by the computing device 410 and/or other servers. The content access application 480 may be executed to obtain and render for display content features from the server or computing device, or other services and/or local storage media.

In some embodiments, the content access application 480 may correspond to code that is executed in the browser 475 or plug-ins to the browser 475. In other embodiments, the content access application 480 may correspond to a standalone application, such as a mobile application. The client device may be configured to execute applications beyond those mentioned above, such as, for example, mobile applications, email applications, instant message applications and/or other applications. Users at client devices 470a may access content features through content display devices or through content access applications 480 executed in the client devices 470a.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Various embodiments of the present technology may be used in environments other than the customer support examples provided above. For example, some embodiments may be used for instructional purposes, such as a classroom or online learning environment. A student may utilize a support application with similar functionality as the customer support application described above, for connecting and re-connecting with other students, faculty and so forth. Other embodiments of the present technology may be utilized in any other context in which one or more user computing devices or communication devices communicate with one or more support computing devices or communication devices via one or more one-way or two-way communication channels.

Figure 5:
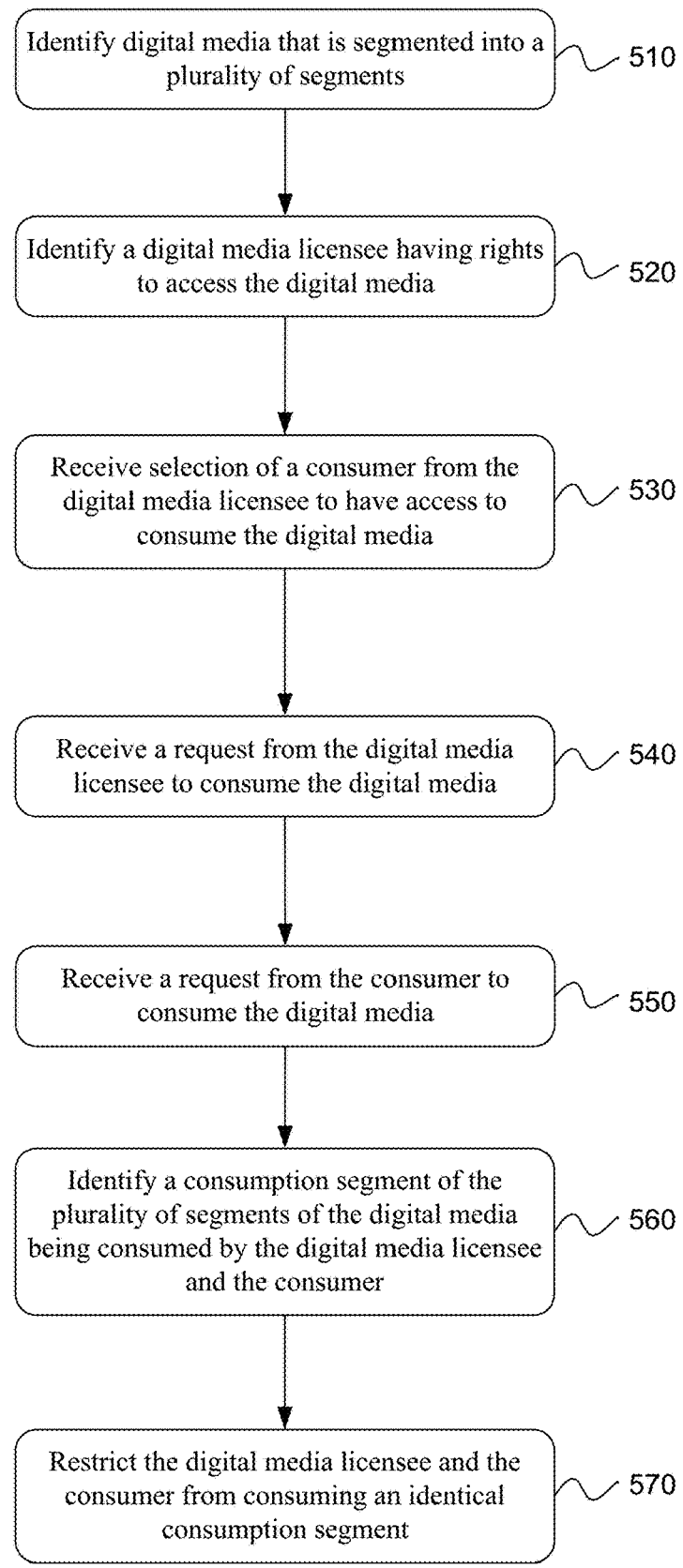
FIGS. 5-7 are flow diagrams for methods of sharing digital media in accordance with examples of the present technology.
Figure 6:
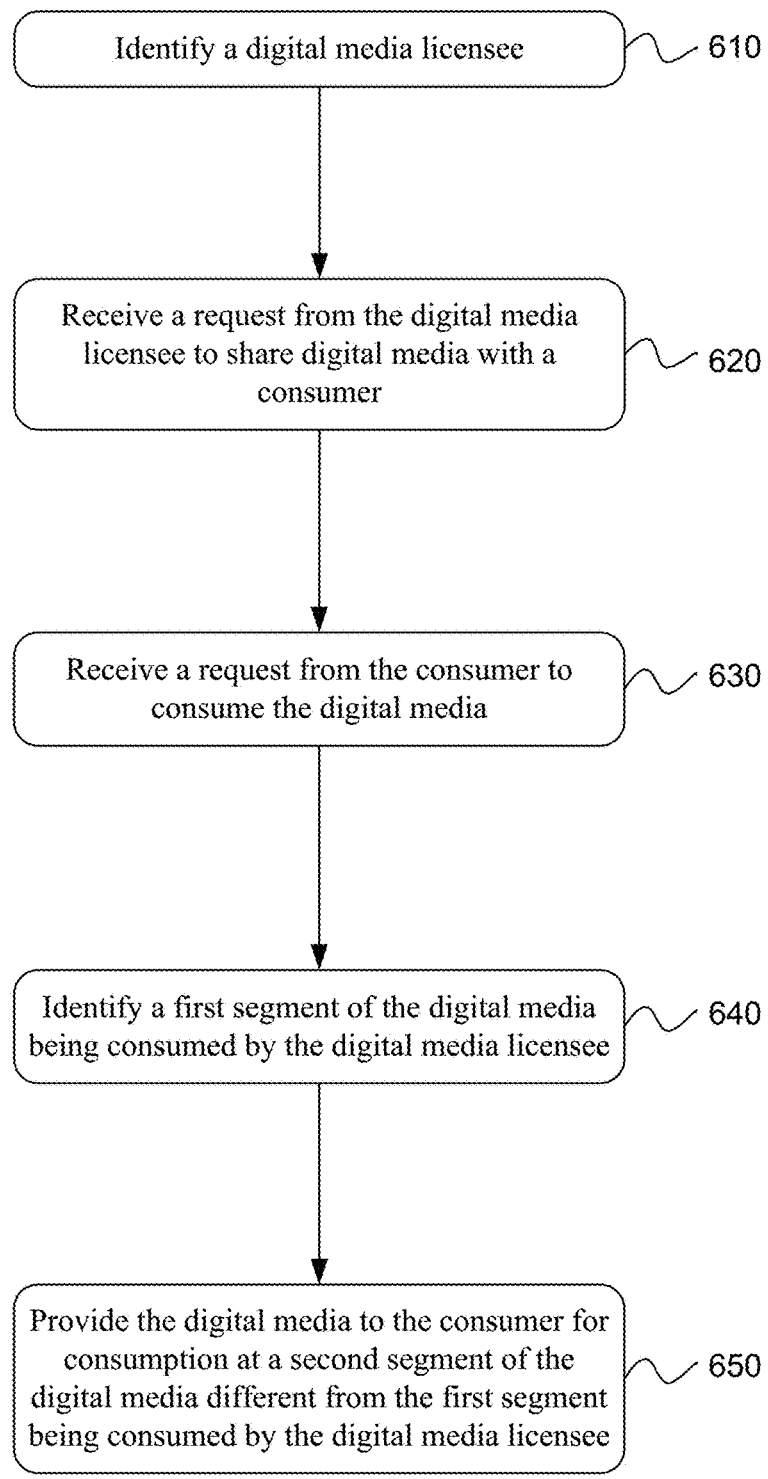
Figure 7:
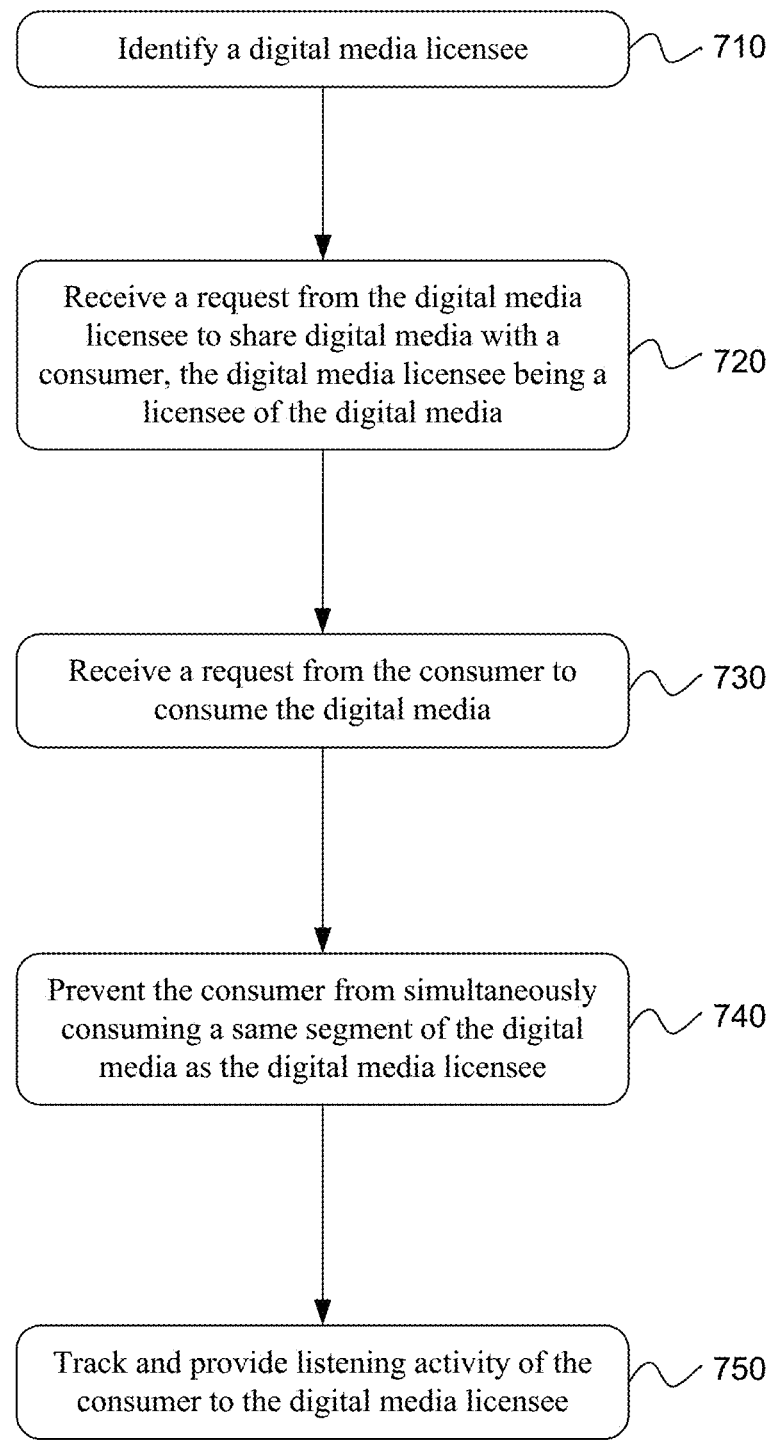

FIGS. 5-7 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring now to FIG. 5, a flow diagram of a method is illustrated for sharing digital media in accordance with an example of the present technology. The method may include identifying 510 digital media that is segmented into a plurality of segments. The digital media may be any suitable type of digital media or content, such as audio, video, image, ebook, text, video games, etc. The method may include identifying 520 a digital media licensee having rights to access the digital media, such as a purchaser of a movie or song, or at least rights thereto. The digital media licensee may select 530 a consumer, such as through invitation by social network, email, or other suitable digital communication method, to grant access to the consumer to consume the digital media. A request may be received 540 from the digital media licensee to consume the digital media. Similarly, a request may be received 550 from the consumer to consume the digital media. In a media server mediated implementation, the media server may identify 560 a consumption segment of the plurality of segments of the digital media being consumed by the digital media licensee and the consumer. The digital media licensee and the consumer may be restricted 570 from consuming an identical consumption segment (i.e., the same segment).

The method may further include receiving selection of a plurality of consumers from the digital media licensee based on contacts of the digital media licensee in a social network. Alternatively, the method may include creating a social network based on selection of a plurality of contacts of the licensee invited to consume the digital media as consumers.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 6, a flow diagram of a method for sharing digital media is illustrated in accordance with an example of the present technology. The method may include identifying 610 a digital media licensee and receiving 620 a request from the digital media licensee to share digital media with a consumer. A request may be received 630 from the consumer requesting to consume the digital media. A first segment of the digital media being consumed by the digital media licensee may be identified 640. The digital media may be provided 650 to the consumer for consumption at a second segment of the digital media different from the first segment being consumed by the digital media licensee. The method may include receiving digital media segment consumption data from the digital media licensee and the consumer to ensure that different segments of the digital media are being consumed by the licensee and the consumer at a given time and when both the licensee and the consumer are consuming segments of the digital media.

The method may be implemented using a computing device that is configured to facilitate the sharing of digital media. The computing device may include, for example, a processor, a memory in electronic communication with the processor and instructions stored in the memory and executable by the processor to perform the method.

The method may include receiving identification of a group of consumers, the consumer being one of the group. The method may also include receiving a request from the digital media licensee to share the digital media with the group of consumers. More specifically, rather than sharing the digital media with consumers on an individual basis, the licensee may share the digital media with entire groups of consumers at a time. As in other examples, the digital media licensee and the consumers may be restricted from simultaneously consuming the same segment of the digital media.

In one example of sharing with groups of consumers, a licensee may share multiple digital media items with restrictions on who may access the digital media, limiting some consumers from accessing one or another of the digital media items. For example, the licensee may wish to share a book with everyone in a social network of the licensee within a predetermined relationship proximity to the licensee within the social network and who has expressed an interest in the topic of the book. Further, the licensee may wish to share a video with consumers outside of a predetermined proximity to the licensee within the social network, such as if the consumers within the predetermined proximity are believed to already have access to the video or have watched to video. There may be some overlap between the groups and some individual may have access to both digital media items. Also, there may be some individuals in the social network of the licensee who do not qualify to borrow either of the digital media items. In other words, permissions may be received from a licensee for a first subset or subgroup of the group of consumers which permissions are different than permissions for a second subset or subgroup of the group of consumers.

In summary, the licensee may establish restrictions on accessing the digital media based on whether a consumer is within the social network of the licensee, the relationship proximity within the social network, preferences of the consumer or licensee, and so forth. The licensee may offer access to the digital content and may revoke access as desired. In another example, the licensee may establish a restriction on accessing a segment of the digital media based on whether the consumer is within a physical proximity of the licensee or a defined location.

In one example, two consumers may belong to a group licensee and may thus both be co-licensees by virtue of membership in the group. Specifically, a group of individuals may pool resources to purchase a license to the digital media. Each member of the group may be granted a license or a partial license. Because individual members may be granted a partial license, individual members may be restricted from sharing the digital media outside of the group. Group members may share the co-owned digital media and consume individual segments of the digital media not being consumed by other members of the group.

In one example, the computing device may be a first user device and the request from the consumer is received from a second user device in communication with the first user device over a local network connection. In another example, the computing device may be a first user device and the request from the consumer is received from a second user device in communication with the first user device over a direct connection. The direct connection may be a device to device connection, such as through wired, Bluetooth, WiFi direct, Near Field Communication (NFC), or other suitable communication protocols or devices. The direct connection may also refer to a connection that does not involve a media management server to negotiate the sharing of the digital media. For example, a connection over a wireless network, with a router facilitating the connection but not managing the sharing of the digital media may be considered a direct connection. In another example, the computing device may be a sharing server (e.g., media management server) and the requests from the digital media licensee and the consumer may be received from user devices in communication with the sharing server over a network connection.

The method may include enforcing at least one restriction on consumption of the digital media by the consumer. Some example restrictions may include: a number of times the consumer is permitted to consume the digital media, an amount of time the consumer is permitted to consume the digital media or a time frame within which the consumer is permitted to consume the digital media. When the consumer is restricted by the restriction or rather when the restriction is enforced, the consumer may be prompted to purchase the digital media.

When there is a conflict regarding consumption of a particular segment of the digital media, such as when two consumers or a licensee and a consumer simultaneously attempt to consume a same segment of the digital media, rules may be used to rank the digital media licensee and the plurality of consumers to establish an order in which the plurality of consumers and the digital media licensee are permitted to consume the digital media. For example, priority may be given to the digital media licensee to consume the segment even when one or more consumers are consuming the segment or queued to consume the segment. In another example, priority may be given to the first to request consumption of the segment. In another example, priority may be established based on relationship to the licensee, such as may be determined from the social network.

Referring now to FIG. 7, a flow diagram of a method for sharing digital media is illustrated in accordance with an example of the present technology. The method may include identifying 710 a digital media licensee and receiving 720 a request from the digital media licensee to share digital media with a consumer. The method may further include receiving 730 a request from the consumer to consume the digital media. The consumer may be prevented 740 from simultaneously consuming a same segment of the digital media as the digital media licensee. Further, the method may include tracking 750 and providing listening activity of the consumer to the digital media licensee as has been described with respect to the report module above. For example, the listening activity may include a report of which consumers listened to a song, how many times, how much of the song and so forth. The listening activity may include other activities detected while the song was playing. For example, if the consumer was driving a car, jogging, playing a game, etc., as may be detected using sensors or other technology in a mobile device, such information may be included in the report. In one example, the listening activity may be presented in near real time similar to a geographic "check-in" system, but where members of the social network may be notified when a consumer begins consuming the digital media. Termination of consumption may be similar to a "check-out", with a corresponding notification.

Similarly as mentioned in the description of the method illustrated in FIG. 5, additional example details, operations, options, variations, etc. that may be part of the methods illustrated in FIGS. 6-7 have been described previously herein and/or are described in further detail below. Various systems, devices, components, modules and so forth for implementing the method may also be used, as described with respect to the various examples included in this disclosure.

Figure 8:
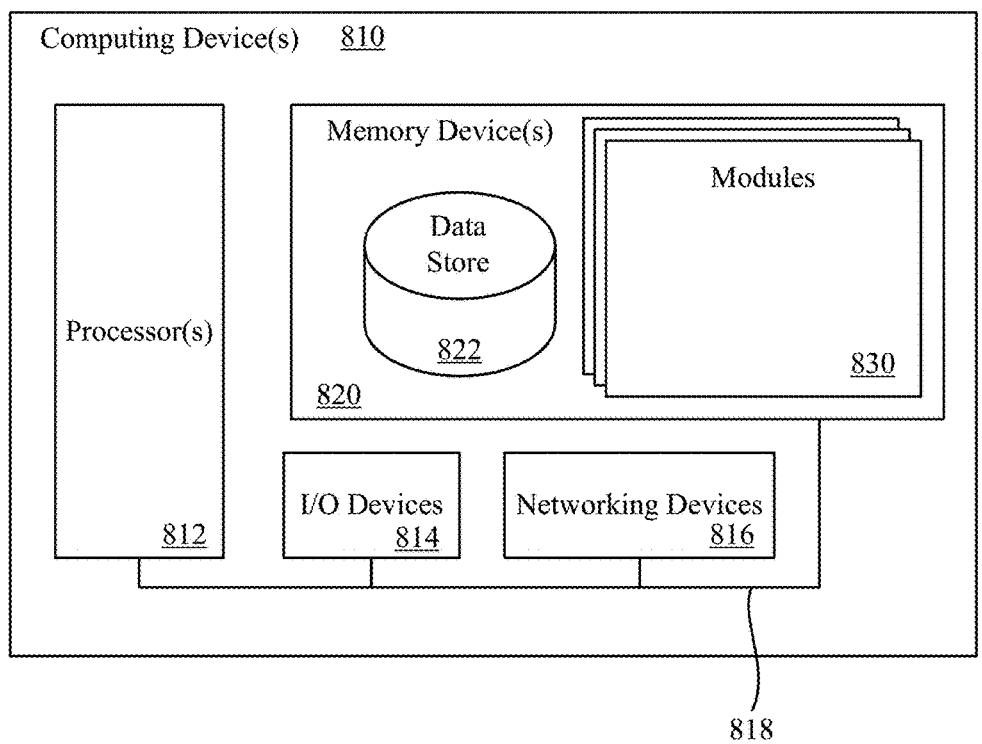
FIG. 8 is a block diagram of a computing system for sharing digital media in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules that are executable by the processor(s) and data for the modules. A data store 822 may also be located in the memory device 820 for storing data related to the modules and other applications along with an operating system that is executable by the processor(s) 812.

The computing device 810 may further include or be in communication with a client device 830, which may include a display device. The client device 830 may be available for an administrator to use in interfacing with the computing device 810, such as to review or make improvements to machine learning models or linked data and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computing device that is configured to facilitate sharing of digital media, comprising:
a processor; and
a memory in electronic communication with the processor, storing instructions being executable by the processor that cause the processor to:
identify a first location of the digital media being consumed by a first consumer device;
identify a first segment of the digital media by providing a first buffer, of a predetermined size, before and after the first location, the first segment being a rolling segment that progresses from the first location of the digital media to a second location of the digital media as the digital media is consumed by the first consumer device;
update the first segment as the first location of the digital media progresses to the second location while being consumed by the first consumer device;
receive a request from a second consumer device to consume the digital media at a third location of the digital media;
identify a second segment of the digital media by providing a second buffer of the predetermined size before and after the third location of the digital media, the second segment being a rolling segment that progresses from the third location of the digital media to a fourth location of the digital media as the digital media is consumed by the second consumer device;

determine whether the first segment and the second segment overlap as the first segment and second segment progress during media consumption; and prevent the second consumer device from consuming the digital media at the second segment when the first segment and second segment overlap.

2. The device of claim 1, wherein the instructions are further executable to receive identification of a group of consumers and to receive a request from a digital media licensee to share the digital media with the group of consumers.

3. The device of claim 1, wherein the instructions are further executable to notify a licensee when the first or second consumer begins or ends consuming the digital media.

4. The device of claim 1, wherein the instructions are further executable to check the first consumer or the second consumer in and out from consumption of the digital media when the first consumer or the second consumer plays or pauses the consumption of the digital media.

5. The device of claim 1, wherein the computing device comprises the first consumer device and the request from the second consumer device is received by the first consumer device over a local network connection.

6. The device of claim 1, wherein the computing device comprises the first consumer device and the request from the second consumer device is received by the first consumer device over a direct connection.

7. The device of claim 1, wherein the computing device comprises a sharing server, and the requests from the first consumer device and the second consumer device are sent to the sharing server over a network connection.

8. The device of claim 1, wherein the instructions are further executable to receive digital media segment consumption data from the first consumer device and the second consumer device to ensure that the second segment of the digital media is different from the first segment being consumed by the first consumer device, and to delay consumption of the first or second segments for the first consumer device or the second consumer device when there is a conflict in consumption of the first or second segments.

9. The device of claim 1, wherein the instructions are further executable to enforce at least one restriction on consumption of the digital media by the first or second consumer device selected from at least one of: a number of times the first or second consumer device is permitted to consume the digital media, an amount of time the first or second consumer device is permitted to consume the digital media, or a time frame within which the first or second consumer device is permitted to consume the digital media.

10. The device of claim 9, wherein the instructions are further executable to prompt the first or second consumer device to purchase the digital media when the restriction is enforced.

11. The device of claim 1, wherein a first consumer, of the first consumer device, is a digital media licensee, the second consumer device comprises a plurality of consumer devices and the instructions are further executable to receive permissions for a first subset of the plurality of consumer devices from the first consumer device that are different than permissions for a second subset of the plurality of consumer devices.

12. The device of claim 1, wherein a second consumer, of the second consumer device, is a co-licensee with a first consumer of the first consumer device.

13. The device of claim 1, wherein a first consumer, of the first consumer device, is a digital media licensee and the instructions are further executable to give priority to the first consumer device to consume the first segment when the second consumer device indicates a desire to consume the first segment.

14. The device of claim 1, wherein a first consumer, of the first consumer device, is a digital media licensee and the second consumer device comprises a plurality of consumer devices, the instructions being further executable to rank the first consumer device and the plurality of consumer devices to establish an order in which the plurality of consumer devices and the first consumer device and permitted to consumer the digital media.

15. The device of claim 1, wherein the digital media includes audio media or video media.

16. The device of claim 1, wherein the digital media includes an electronic book.

17. The device of claim 16, wherein the first and second segments of the electronic book are chapters.

18. The device of claim 1, wherein the first and second segments are time-based segmentations of the digital media.

19. A computing device that is configured to facilitate sharing of digital media, comprising:

a processor; and a memory in electronic communication with the processor, storing instructions being executable by the processor that cause the processor to:

identify a first location of the digital media being consumed by a first consumer device;

identify a first segment of the digital media by providing a first buffer, of a predetermined size, before and after the first location, the first segment being a rolling segment that progresses from the first location of the digital media to a second location of the digital media as the digital media is consumed by the first consumer device;

update the first segment as the first location of the digital media progresses to the second location while being consumed by the first consumer device;

receive a request from a second consumer device to consume the digital media at a third location of the digital media;

identify a second segment of the digital media by providing a second buffer of the predetermined size before and after the third location of the digital media, the second segment being a rolling segment that progresses from the third location of the digital media to a fourth location of the digital media as the digital media is consumed by the second consumer device;

determine whether the first segment and the second segment overlap as the first segment and second segment progress during media consumption; and prevent the second consumer device from consuming the digital media at the second segment when the first segment and second segment overlap.

* * * * *